United States Patent
Song et al.

(10) Patent No.: US 9,421,740 B2
(45) Date of Patent: Aug. 23, 2016

(54) ZIRCONIUM ALLOY FOR IMPROVING RESISTANCE TO OXIDATION AT VERY HIGH TEMPERATURE AND FABRICATION METHOD THEREOF

(71) Applicants: Korea Atomic Energy Research Institute, Daejeon (KR); Korea Hydro and Nuclear Power Co., Ltd., Gyeongsangbuk-do (KR)

(72) Inventors: Kun-Woo Song, Daejeon (KR); Yang-Hyun Koo, Daejeon (KR); Byoung-Kwon Choi, Daejeon (KR); Il-Hyun Kim, Chungcheongnam-do (KR); Hyun-Gil Kim, Daejeon (KR); Yang-Il Jung, Daejeon (KR); Dong Jun Park, Daejeon (KR); Jeong-Yong Park, Daejeon (KR)

(73) Assignees: Korea Atomic Energy Research Institute, Daejeon (KR); Korea Hydro and Nuclear Power Co., LTD., Gyeongsangbuk-Do (KR)

( * ) Notice: Subject to any disclaimer, the term of this patent is extended or adjusted under 35 U.S.C. 154(b) by 174 days.

(21) Appl. No.: 13/670,515

(22) Filed: Nov. 7, 2012

(65) Prior Publication Data

US 2013/0302639 A1 Nov. 14, 2013

(30) Foreign Application Priority Data

May 10, 2012 (KR) .................. 10-2012-0049681

(51) Int. Cl.
*C23C 4/04* (2006.01)
*C23C 4/08* (2016.01)
(Continued)

(52) U.S. Cl.
CPC .............. *B32B 15/01* (2013.01); *C22C 16/00* (2013.01); *C22F 1/186* (2013.01); *C23C 4/02* (2013.01);
(Continued)

(58) Field of Classification Search
CPC ........................................................ C23C 4/08
USPC .......................................................... 427/452
See application file for complete search history.

(56) References Cited

U.S. PATENT DOCUMENTS 3,502,549 A * 3/1970 Charveriat .................... 205/228
4,017,368 A * 4/1977 Wax .......................... C25D 5/38
205/131
(Continued)

FOREIGN PATENT DOCUMENTS

GB 1 237 238 * 6/1971
JP 61-041758 * 2/1986
KR 1020060022768 A 3/2006

OTHER PUBLICATIONS

Thermal Spraying:Practice, Theory, and Application, American Welding Society, Inc., 1985, pp. 16-19 and 22.*

(Continued)

*Primary Examiner* — Katherine A Bareford
(74) *Attorney, Agent, or Firm* — Fredrikson & Byron, P.A.

(57) ABSTRACT

A zirconium alloy for use in nuclear fuel assemblies is provided, which provides increased resistance against oxidation and corrosion and also improved bonding with parent material, because pure metallic material such as silicon (Si) or chromium (Cr) is evenly coated on the surface of the parent material by plasma spraying. Because the plasma spray coating used to coat the pure metallic material on the zirconium alloy does not require vacuum equipment and also is not limited due to the shape of the coated product, this is particularly useful when evenly treating the surface of the component such as 4 m-long tube or spacer grip arrangement which is very complicated in shape. Furthermore, because the coated zirconium alloy confers excellent resistance to oxidation and corrosion under emergency such as accident as well as normal service condition, both the economic and safety aspects of nuclear fuel are improved.

6 Claims, 4 Drawing Sheets

(51) Int. Cl.
*C23C 4/12* (2016.01)
*B32B 15/01* (2006.01)
*C23C 4/18* (2006.01)
*C23C 4/02* (2006.01)
*C22C 16/00* (2006.01)
*C22F 1/18* (2006.01)
*G21C 3/07* (2006.01)
*G21C 3/30* (2006.01)

(52) U.S. Cl.
CPC ............... *C23C 4/08* (2013.01); *C23C 4/134* (2016.01); *C23C 4/18* (2013.01); *G21C 3/07* (2013.01); *G21C 3/30* (2013.01); *Y02E 30/40* (2013.01); *Y10T 428/12674* (2015.01); *Y10T 428/12812* (2015.01)

(56) References Cited

U.S. PATENT DOCUMENTS

| | | |
|---|---|---|
| 4,279,667 A | 7/1981 | Anthony et al. |
| 4,427,516 A * | 1/1984 | Levinstein et al. ...... 204/192.38 |
| 4,746,534 A * | 5/1988 | Phillippi et al. ............... 427/454 |
| 5,171,520 A | 12/1992 | Bryan et al. |
| 5,227,129 A | 7/1993 | Bryan et al. |
| 5,268,946 A | 12/1993 | Bryan et al. |
| 2004/0022346 A1* | 2/2004 | Kim et al. ................... 376/305 |
| 2010/0091934 A1* | 4/2010 | Kim et al. ................... 376/416 |

OTHER PUBLICATIONS

Longo, "Postcoating Operations", in Handbook of Thermal Spray Technology, J.R. Davis, editor, ASM linternational and the Thermal Spray Society, 2004, pp. 128-131.*

Substech, "High temperature oxidation of metals", substech.com, 4 pages, accessed Jul. 16, 2015.*

Shimada, S., "Interfacial reaction on oxidation of carbides with formation of carbon," Solid State Ionics 141-142 (2001, pp. 99-104.

Krusin-Elbaum, L. et al., "Oxidation Kinetics of ZrN Thin Films," Thin Solid Films, 107 (1983), pp. 111-116.

Sridharan, K., et al., "Oxidation of plasma surface modified zirconium alloy in pressurized high temperature water," Materials and Design 28 (2007), pp. 1177-1185.

* cited by examiner

```
PLASMA SPRAY COATING OF
ZIRCONIUM ALLOY
```

```
PRE-TREATMENT:
SANDBLASTING
```

```
SURFACE COATING: ROOM TEMPERA-
TURE PROCESSING, SILICON OR CHRO-
MIUM COATING MATERIAL, PLASMA-
SPRAYING
```

```
POST-PROCESSING: HEAT
TREATMENT 350 °C X 4 Hr
```

ZIRCONIUM ALLOY FOR IMPROVING RESISTANCE TO OXIDATION AT VERY HIGH TEMPERATURE AND FABRICATION METHOD THEREOF

CROSS-REFERENCES TO RELATED APPLICATION

This application claims priority from Korean Patent Application No. 10-2012-0049681, filed on May 10, 2012, in the Korean Intellectual Property Office, the contents of which are incorporated herein by reference in its entirety

BACKGROUND OF THE INVENTION

1. Field of the Invention

The present invention relates to a method of producing zirconium alloy with improved resistance to oxidation at very high temperature.

2. Description of the Related Art

Zirconium was hardly known before 1940, but gained attention mainly for its low neutron-capture cross-section and was utilized mostly in the nuclear energy-related engineering materials and nuclear energy substances. Because zirconium particularly has low neutron absorption cross-section and good resistance to corrosion, and intrinsically does not form radioactive isotopes, the material is critically used in the nuclear reactor components such as spacer grid, guide tube, heavy water reactor pressure tube, or cladding tube for a nuclear fuel rod, or alloy with uranium.

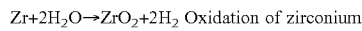
$Zr+2H_2O \rightarrow ZrO_2+2H_2$ Oxidation of zirconium

However, zirconium alloy component generates hydrogen due to oxidation reaction between zirconium and water, which is absorbed into zirconium alloy components to form hydroxide layer(s) and, in turn, causes mechanical deformation and degradation of resistance to instability of the fuel assemblies. To overcome this shortcoming, studies have been conducted to find ways to increase resistance to oxidation and resistance to corrosiveness of the zirconium alloy. Considering the advantage of prolonged lifespan of the reactor rod structures, studies are actively conducted to develop appropriate alloys for use therein.

In the meantime, the stability of the cladding tube has been in increasing demand particularly in the event of emergency such as accident.

As learned from the incidence of reactors 1, 2 and 3 of Fukushima I Power Plant (Japan), when cooling of reactors is interrupted due to natural disasters such as earthquake or tsunami or man-made disaster, the cladding tube is exposed to high temperature so that hydrogen with high risk of detonation is massively generated due to considerably high velocity of corrosion. The hydrogen detonates when it is leaked into the containment buildings of the reactor. The hydrogen explosion in the power plant must be prevented, because this could lead to tragic disasters which could accompany leakage of radioactive substance.

Looking at the zirconium alloys currently available, these alloys do not pose considerable problems under normal condition. However, the safety of the alloys is not guaranteed when an accident occurs such as generation and detonation of hydrogen. A sufficient time has to be ensured for the management of the emergent situation before the generation of hydrogen in order to improve the safety of the nuclear power plant, and this will be possible if the nuclear fuel cladding tube has a sufficient resistance against oxidation when exposed to the emergency conditions.

The currently-available method for fabricating a zirconium alloy for use in a cladding tube basically adjusts the ratios of the alloying elements such as niobium (Nb), tin (Sn), iron (Fe), chromium (Cr), oxygen (O), or the like. However, limited oxidation resistance is expected by the method of using such alloying elements at high temperature environment. The effect of oxidation resistance that can be provided by adjusting ratios in the alloying elements is particularly insufficient to maintain resistance to oxidation under the emergency condition of the power plant which accompanies exposure to extremely high temperature for a prolonged time. The zirconium alloy has rapidly degrading oxidation resistance when temperature rises. The currently-available alloying technique, which is based on the fine adjustment of alloying composition, would not be sufficient to ensure efficiency under high temperature corrosion condition. Accordingly, it is necessary to take a step forward, for the improved accident safety of the nuclear fuel.

Meanwhile, the stability of the nuclear fuel assemblies can be increased by coating anti-oxidation material onto the surface of zirconium alloy to thus improve the resistance of zirconium alloy against oxidation at high temperature. If an anti-oxidation substance, which is stable at high temperature, is coated on the surface of the zirconium alloy to prevent oxidation from occurring when the alloy is unexpectedly exposed to high temperature environments due to changes in the environment, the oxidation reaction can be effectively restricted and less hydrogen would be generated, and therefore, danger factors such as hydrogen explosion can be prevented or reduced. However, a few substances are known for inhibiting oxidation at high temperature, and it is also a great challenge to ensure good bonding between zirconium alloy layer and coating layer of the anti-oxidation substance to prevent physical damages even at high temperature.

U.S. Pat. Nos. 5,171,520 and 5,268,946 teach a technology to coat ceramic and glass material with flam spraying to enhance wear resistance of the cladding tube.

U.S. Pat. No. 5,227,129 discloses a method for coating zirconium nitride (ZrN) with cathodic arc plasma decomposition to enhance corrosion resistance and wear characteristics.

The above patents aim to improve anti-corrosion and wear resistance of the nuclear fuel cladding tube under normal condition, and has drawbacks of limited control on the compositions of the coating layer due to use of inter-metallic compounds (ZrN, ZrC), or ceramic (zircon) or glass (Ca-ZnB, CaMgAl, NaBSi) as the coating material. The patents also have the shortcoming of considerable differences between the coating layer and the parent material causing physical damage (e.g., crack and scrape off) due to thermal expansion and deformation. Indeed, studies reported that the layer becomes porous when oxidized at high temperature so that improvement of corrosion resistance is hardly anticipatable under emergency condition of the nuclear power plant (S. Shimada, Solid state ionics 141 (2001), 99-104; L. Krusin-Elbaum, M. Wittmer, Thin Solid Films, 107 (1983), 111-117).

Conventional studies on coatings on nuclear fuel claddings aim to overcome limited corrosion resistance by utilizing alloying elements, i.e., by forming a layer with resistance to corrosion and wear using methods such as ion implantation, Zr—N layer deposition, or the like.

U.S. Pat. No. 4,279,667 discloses a zirconium alloy structure and a processing method thereof, which use ion implantation to improve corrosion resistance.

Korean Pat. No. 2006-0022768 discloses a technology to form Zr(C, N) layer on the surface of a cladding tube by chemical vapor deposition (CVD) or physical vapor deposition (PVD) to improve corrosion characteristic of the zirconium alloy cladding tube.

However, these technologies have shortcomings in that the layer newly generated on the surface is not thick enough to effectively prevent corrosion, or due to columnar crystal structure thereof, unable to prevent oxidation due to intergranular diffusion of oxygen. Accordingly, a process is necessary, which generates a layer that does not easily allow diffusion of oxygen on the surface of the nuclear fuel cladding tube to a sufficient thickness to prevent corrosion of the cladding tube during the normal operation condition in reactor.

In consideration of the above, the present inventors have come up with a zirconium alloy with greatly improved resistance to oxidation at very high temperature by evenly coating a pure metallic substance with excellent resistance to oxidation onto zirconium alloy with plasma spraying.

SUMMARY OF THE INVENTION

An embodiment of the present invention provides a zirconium alloy with excellent resistance to oxidation at very high temperature, and excellent resistance to corrosion and also excellent bonding with parent material.

Another embodiment of the present invention provides a method for fabricating the zirconium alloy.

In a specific embodiment of the present invention, a zirconium alloy is provided with excellent resistance to oxidation at very high temperature, and excellent resistance to corrosion and also excellent bonding with parent material, in which silicon (Si) or chromium (Cr) as a pure metallic material is evenly coated on a surface of the parent material by plasma spraying.

In another specific embodiment of the present invention, a method is provided for fabricating a zirconium alloy, which may include steps of: pre-treatment the surface of a zirconium alloy parent material (step 1); coating a pure metallic material on the pre-treated parent material surface by plasma spraying (step 2); and thermally treating the parent material coated at step 2.

In some embodiments according to the present invention, since the method of coating zirconium alloy by plasma-spraying with pure metallic material is not limited by the shape of the coated product and also does not require vacuum equipment, it is very useful to evenly coat surfaces of the components such as 4 m tube in length and spacer grid with rather complicated shape. Further, since the nuclear fuel assembly using zirconium alloy coated articles according to embodiments of the invention has excellent resistance to oxidation and corrosion under emergency condition as well as normal condition, economic and safety aspects of the nuclear fuel can be improved. Further, since the coating technique to provide this improved resistance to oxidation at very high temperature is applicable in other existent industrial substances, the technique provides benefits, considering cost and time that would be otherwise useful for developing new materials, when particularly implemented in the fields of general industry and logistics industry.

BRIEF DESCRIPTION OF THE DRAWINGS

The above and/or other aspects and advantages of certain embodiments of the present invention will become apparent and more readily appreciated from the following detailed description, taken in conjunction with the accompanying drawings of which.

DETAILED DESCRIPTION OF THE INVENTION

Figure 1:
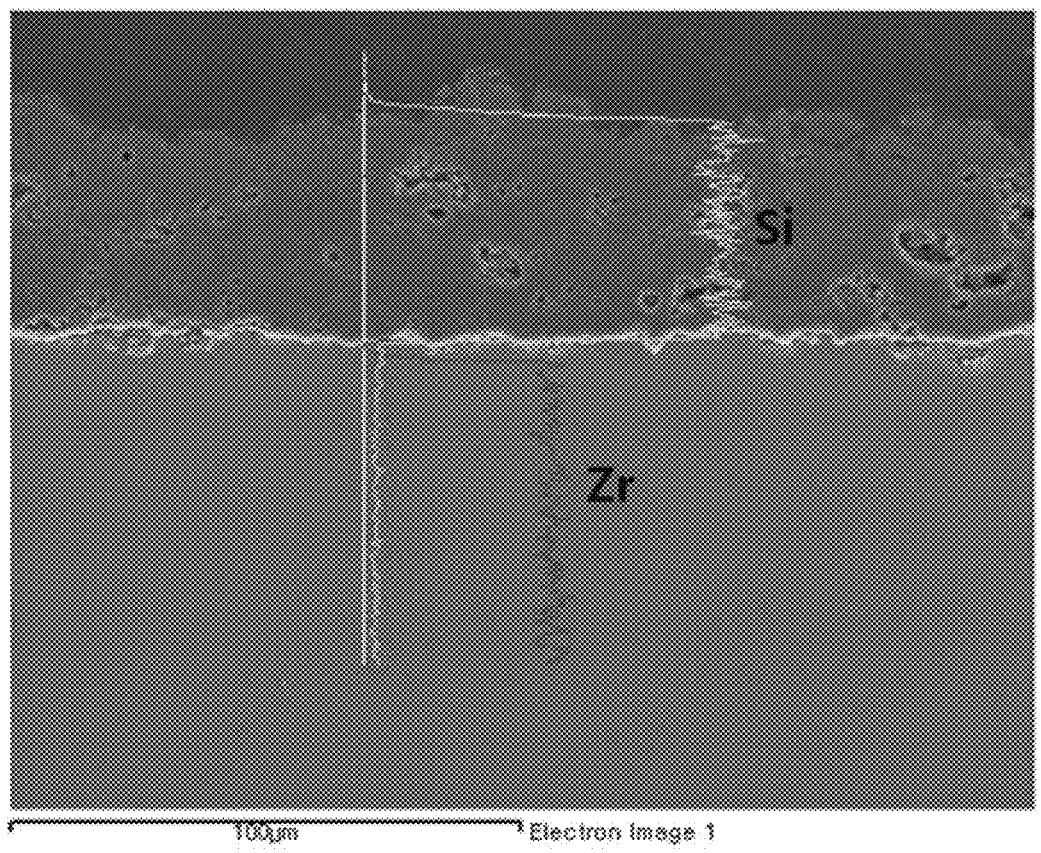
FIG. 1 is a SEM image of a sample of Example 1 which is coated by plasma spraying.

Reference will now be made in detail to non-limiting embodiments of the present invention, examples of which are illustrated in the accompanying drawings, wherein like reference numerals refer to the like elements throughout. These embodiments are described below to explain the present invention by referring to the figures.

An embodiment of the present invention provides a zirconium alloy in which a pure metal is evenly coated on a surface of parent material by plasma spraying.

In one embodiment, the pure metallic material may preferably be silicon (Si) or chromium (Cr).

To be specific, the silicon (Si) or chromium (Cr) as pure metallic material may be coated by room temperature processing. Further, these metallic materials are less limited by the surface morphology. Further, because plasma spraying is used for the coating, additional equipment such as vacuum equipment, which is required for CVD or PVD, is not required and thus cost is saved. By evenly coating the metallic materials on the surface of a parent material using highly-efficient plasma spraying, oxide layer, which remains stable under high-temperature condition due to the presence of the coating layer, is generated, thus providing increased resistance to oxidation and corrosion. Further, the thermal expansion rate of the pure metallic materials which are similar to the parent material can minimize cracks and interfacial debonding of the bonded portions. As a result, it is possible to fabricate a zirconium alloy for use in nuclear fuel assembly components, with providing improved bonding to the parent material.

Further, for the Zirconium alloy according to the present invention, the parent material may include alloys of zirconium sold commonly under the trademarked names, such as Zircaloy-4, Zircaloy-2, ZIRLO, M5 or HANA, but not limited thereto.

The cladding tubes used in the nuclear fuel of the nuclear power plants currently run for electricity supply are fabricated from zirconium alloy, and more specifically, Zircaloy-4 and Zircaloy-2 are mainly used as the nuclear fuel cladding tubes for commercial power plants. Further, ZIRLO, M5 and HANA have been relatively recently developed to improve resistance to corrosion and used in commercial power plant. These alloys are among the preferable parent materials according to the present invention.

Although the thickness of the coating layer of pure metallic material on the parent material according to the present invention is not strictly limited as long as the coating layer improves the properties of the fabricated components such as resistance to oxidation, resistance to corrosion and bonding, the thickness of the coating layer may be adjusted to be within a range of 1 to 500 micrometer. If the thickness of the pure metallic material coating layer is below 1 micrometer, the coating layer would be too thin to form sufficient oxide layer to prevent oxidation of the zirconium alloy. On the contrary, if the thickness of the coating layer exceeds 500 micrometer, such increased thickness can compromise the mechanical wholesomeness and it is also not beneficial economically.

Furthermore, the zirconium alloy according to the present invention is applicable to wide range of technical fields including not only the nuclear fuel assemblies, but also metallic or ceramic materials for use in thermal power generation, the aerospace industry, or military.

Further, the nuclear fuel assemblies according to the present invention may include cladding tubes, guide tubes, instrumentation tubes, or spacer grids. The material for the nuclear fuel assemblies will desirably have enough resistance to oxidation to prevent or inhibit the growth of oxide layers and mechanical deformation due to corrosive environments under high temperature and pressure. It is also desirable that the materials used in nuclear fuel assemblies and their components which can prevent or inhibit hydrogen production and detonation of massive amounts of hydrogen under high temperature oxidative atmosphere where the temperature of the nuclear fuel is extremely high as in the case of accident. In consideration of the above, the metal plasma coated zirconium alloy according to the present invention can be effectively used in the nuclear fuel assemblies.

Furthermore, the pure metallic substance coated on the surface of the zirconium alloy parent material according to the present invention is oxidized at high temperature to form oxides such as silicon dioxide ($SiO_2$) or chromium oxide ($Cr_2O_3$), to thus confer oxidation resistance. As for the pure metallic materials for coating on the parent material, silicon (Si) has the properties that reduce hydrogen absorption on the zirconium matrix, and also retard transition phenomenon in which corrosion rapidly increases over time. Silicon (Si) also has oxidation resistance from room temperature to high temperature by forming oxide (i.e., $SiO_2$) when it is oxidized. Chromium (Cr) is also a transition metal and causes irregular orientations of the growth of the oxide layer particles. This prevents growth of the oxide layer in one direction. Accordingly, abrupt disintegration of the oxide layer is restricted. Similar to Silicon (Si), chromium also forms oxide layer of chromium oxide ($Cr_2O_3$) which confers oxidation resistance from room temperature to high temperature as silicon dioxide does.

Because the pure metallic material coated on the zirconium alloy parent material plastic deforms at high temperature, cracking or scraping away of the coating layer is restricted, and bonding with the parent material is improved. The pure metallic materials (Si, Cr) are used because the materials confer high heat conductivity, which is their characteristic property, to the ceramic which has been generally used, to thereby guarantee heat conductivity of the zirconium cladding tube of the nuclear energy generation after coating. Further, the interfacial debonding or crack of the coating layer occurs due to differences of thermal expansion rates according to temperature increase when the metallic material is coated with ceramic and intermetallic compound. However, when the metallic coating material (e.g., Si, Cr) has thermal expansion rate and/or other properties similar to those of the parent material, the relatively higher plasticity than ceramic, the crack and interfacial debonding due to thermal expansion rates can be minimized. Further, the conventional ceramic coating does not ensure even coating layers due to high melting point of the ceramic, and the intermetallic compounds do not ensure accurate control on the composition or deposition rates and crystal structure of the compounds. However, coating with the pure metallic material can solve the problems mentioned above.

Figure 4:
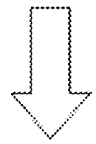
FIG. 4 is a view provided to explain a process of fabricating zirconium alloy coated according to the present invention.
Figure 4:
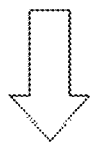

Furthermore, the present invention provides a method for fabricating zirconium alloy, which may include steps of: pre-treatment a surface of a zirconium alloy parent material (step 1); coating a pure metallic material on the surface of the pre-treated alloy parent material of step 1 by plasma spraying (step 2); and thermally treating the parent material coated at step 2 (step 3). Note FIG. 4, for example.

The respective steps of the fabricating method will be explained in greater detail below.

First, in step 1, the surface of the zirconium alloy parent material is pre-treated.

The pre-treatment of the surface of the parent material is performed with a purpose to improve or enhance interfacial bonding. To be specific, step 1 may include removal of foreign substances and contaminants from the surface of the zirconium alloy.

The pre-treatment of step 1 according to the present invention may preferably include grinding, by using particles of an oxide, intermetallic compounds or silicon compounds. By treating the surface with these particles, foreign substances are removed, and adjustment of surface roughness also improves bonding with the coating material. For example, the pre-treatment may be performed by sandblasting or shot blasting.

In step 2, pure metallic material is coated on the surface of the pre-treated parent material of step 1 by plasma spraying.

To be specific, the coating by plasma spraying of step 2 generates inactive gas plasma at temperatures ranging between several-thousand degrees and several hundred and thousand degrees (° C.), and thereby instantly converts the pure metallic material powder into liquid form for the coating. This coating technique has the advantages such as availability for room temperature processing, less limits on the surface morphology, and no need for vacuum equipment for the chemical or physical vapor deposition.

Next, in step 3 according to the present invention, the parent material coated in step 2 is thermally treated.

The heat treatment of step 3 according to the present invention may preferably be performed at temperatures below a melting temperature of the pure metallic material. By the heat treatment of the zirconium parent material, which is evenly coated, the energy from the surface stress facilitates diffusion reactions with the coating material, to thereby increase bonding. If the temperature of the heat treatment exceeds the melting temperature of the pure metallic material, the coated pure metallic material would melt during heat treatment, causing formation of uneven coating layers after the heat treatment, i.e., during cooling, and undesirable variations in the dimensions of the tube.

The present invention will be explained below in greater detail with reference to the examples. However, the examples are given only for illustrative purpose, and the embodiments of the present invention is not limited to specific examples.

Example 1

Fabrication of Zirconium Alloy Coated with Pure Metal Plasma Spray Coating

Step 1: Pre-Treatment Surface of Zirconium Alloy Parent Material

FIG. 1 is a SEM image of a sample of Example 1 which is coated by plasma spraying. Zircaloy-4 was used as the zirconium alloy for coating, and the sample for coating was cut to size of 100 mm×30 mm×2.4 mm (length×width×thickness). The sample underwent sandblasting with the sandblaster (DSB-100, Depung, Korea) in which 150 grit aluminum oxide (Yi Long) was propelled, with 7.5 mm of bore, and 6 kg/cm$^2$ of working pressure.

Step 2: Plasma Spray Coating Pure Metallic Material on the Surface of Parent Material The pure metal, Si, was coated to a thickness of 90 microns on the sample pre-treated in step 1 in the following manner. LCP Rev. A (Sulzer metcol) was used as the plasma equipment, and argon (Ar) was used as the inactive or inert gas. With use of Twin 100C feeders, high purity silicon (Si) powder (Jungsei) was propelled through Ar inlet under pressure of 100 MPadml, and the plasma spray coating was performed three times, each for 20 sec, according to the programming to propel the molten powder against the surface of the sample in zigzag pattern. The plasma gun and the sample were maintained at a 10 cm distance from each other.

Step 3: Heat Treating Coated Parent Material

The sample coated in step 2 was heat-treated with a general box-type heat treating machine, in an inert, argon (Ar) gas atmosphere, 350° C., 4 h, to prevent oxidation.

Examples 2-9

Fabrication of Zirconium Alloy Coated with Pure Metal Plasma Spray Coating

Except for the variations in the condition of fabrication and coating thicknesses listed in the following table, the zirconium alloy coated with the pure metal plasma spray coating was fabricated in the same manner as in Example 1.

TABLE 1

|  | Coating material | Sandblasting before coating | Coating thickness (micron) | Heat treatment after coating | Non-coated surface |
|---|---|---|---|---|---|
| Ex. 1 | Si | ✓ | 90 | 350° C. @ 4 hr | Com. Ex 1 |
| Ex. 2 | Si | N/A | 90 | 350° C. @ 4 hr | Com. Ex 2 |
| Ex. 3 | Si | ✓ | 90 | N/A | Com. Ex 3 |
| Ex. 4 | Si | ✓ | 20 | N/A | Com. Ex 4 |
| Ex. 5 | Si | ✓ | 130 | 350° C. @ 4 hr | Com. Ex 5 |
| Ex. 6 | Cr | ✓ | 5 | 350° C. @ 4 hr | Com. Ex 6 |
| Ex. 7 | Cr | ✓ | 20 | 350° C. @ 4 hr | Com. Ex 7 |
| Ex. 8 | Cr | N/A | 5 | N/A | Com. Ex 8 |
| Ex. 9 | Cr | N/A | 20 | N/A | Com. Ex 9 |

Comparative Examples 1-9

In order to compare oxidation characteristics of the coating layers at high temperature condition, only one surface of each of the samples of the Example was coated, while the other surface was left un-coated and observed as Comparative Examples 1-9.

The experiment result of high temperature oxidation of zirconium alloy parent material, coated with the pure metallic material, is provided below.

<Experiment 1> High Temperature Oxidation

In order to investigate differences of the oxidative properties between the zirconium alloy coated according to the present invention and non-coated zirconium alloy, the following experiment has been conducted with respect to the zirconium alloys of Examples 1-9 and those of Comparative Examples 1-9.

The zirconium alloys of Examples 1-9 and the zirconium alloys of Comparative Examples 1-9 were cut to 10×10 mm samples sizes, and the cut surface was ground with silicon carbide (Sic) paper. The ground sample was washed by ultrasonic cleaning in 50:50 acetone and alcohol solution for 5 min, and dried. The dried samples were mounted on test equipment for high temperature oxidation and then mixed gas of steam and argon was flowed with 10 ml/min flowrate. The temperature of the samples were raised 20° C. per sec using the reverberatory furnace attached to the equipment, and the temperature was maintained at a very high temperature of about 1000° C. for 1000 sec. Power to the reverberatory furnace was then turned off and the samples were cooled down by increasing the argon gas pressure 3-fold or greater. The evaluation of oxidation characteristic was carried out in a manner in which samples were prepared to enable observation on the cross section thereof after oxidation occurred at high temperature vapor condition, so that the coated surfaces (FIG. 2: Examples) and the non-coated surfaces (FIG. 3: Comparative Examples) of the samples were observed with scanning electron microscope (SEM) and the thickness of the oxide layer was measured and the results were tabulated as below.

TABLE 2

| Thickness (micron) of oxide layer on coated surface (plasma spraying) | | Thickness (micron) of oxide layer on non-coated surface | |
|---|---|---|---|
| Ex. 1 | <3 | Com. Ex. 1 | 36 |
| Ex. 2 | <3 | Com. Ex. 2 | 35 |
| Ex. 3 | <3 | Com. Ex. 3 | 37 |
| Ex. 4 | <4 | Com. Ex. 4 | 34 |
| Ex. 5 | <3 | Com. Ex. 5 | 35 |
| Ex. 6 | <2 | Com. Ex. 6 | 35 |
| Ex. 7 | <2 | Com. Ex. 7 | 37 |
| Ex. 8 | <2 | Com. Ex. 8 | 36 |
| Ex. 9 | <2 | Com. Ex. 9 | 35 |

Figure 2:
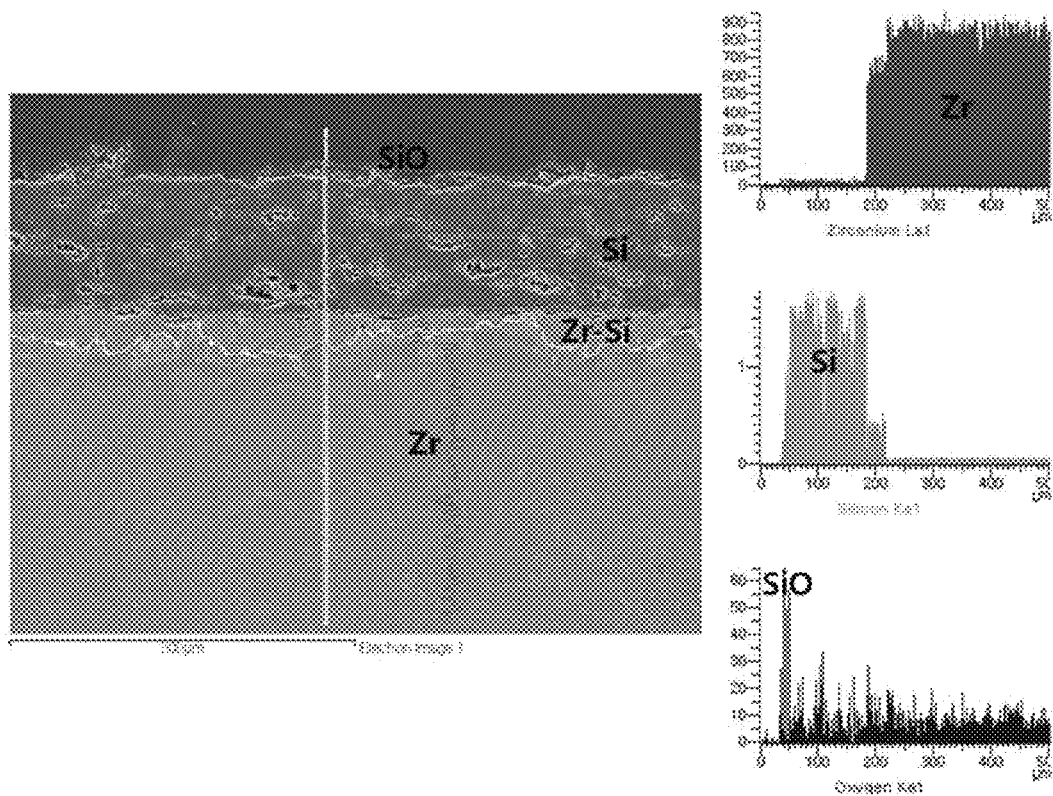
FIG. 2 is a SEM cross-section image of a sample of Example 5 coated by plasma spraying, showing result of oxidation test at very high temperature with mixed gas of steam and argon of 1000° C., 1000 sec.
Figure 3:
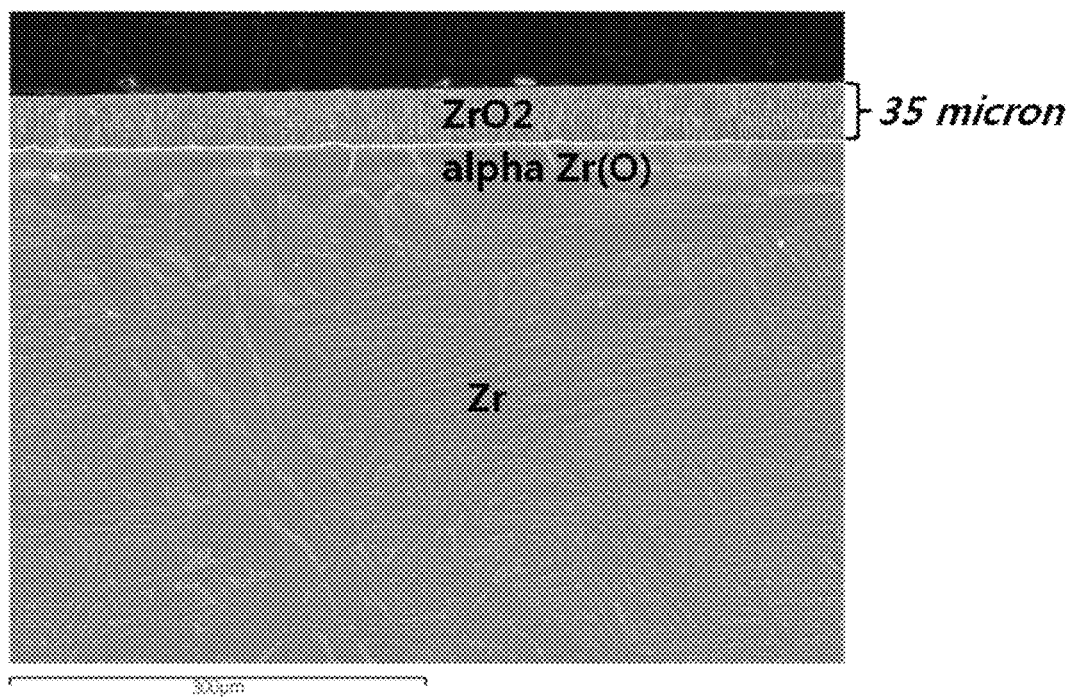
FIG. 3 is a SEM cross-section image of a sample of Comparative Example 5 coated by plasma, showing result of oxidation test at very high temperature with mixed gas of steam and argon of 1000° C., 1000 sec.

Referring to FIG. 2, from the oxidation experiment consisting of heating up to 1000° C. and cooling down, scraping off of the coating layer, which is the usual result of thermal expansion and oxidation reaction, was not observed. However, the diffusion layer was observed on the interface between the coating layer (Si or Cr) and the parent material (Zr).

Table 2 particularly lists the results of measuring, by SEM, the thickness of the oxide layer which underwent oxidation experiment under high temperature environment mixed with steam and argon for 1000 sec, and this confirms improved resistance to oxidation of the coated zirconium parent material by showing that the thickness of the oxide layer was only several or a few microns on the surface which underwent plasma spray coating, while the thickness of the oxide layer was above 30 microns on the zirconium parent material which was not coated.

As a result, by confirming the excellent resistance to oxidation of the plasma coating layer of the pure metal (Si or Cr) even at high temperature, it was confirmed that metallic or ceramic parent materials coated according to embodiments of the present invention are efficiently applicable for use in environments that require resistance to oxidation at very high temperature.

While the present invention has been particularly shown and described with reference to exemplary embodiments thereof, it will be understood by those skilled in the art that various changes in form and details may be made therein without departing from the spirit and scope of the invention as defined by the appended claims.

The invention claimed is:

1. A method for fabricating a coated zirconium alloy article, the method comprising steps of:
    pre-treating a surface of a zirconium alloy parent material (step 1);
    providing a pure metallic material of silicon (Si) or chromium (Cr) in powder form (step 2);
    maintaining a distance between a plasma gun and the parent material at 10 cm and plasma spraying only the pure metallic material of Si or Cr on the surface of the pre-treated parent material of step 1 with the plasma gun (step 3) to form a coating layer on the pre-treated parent material; and
    thermally-treating the coated parent material coated in step 3 in an inert atmosphere (step 4) to create a diffusion layer comprising zirconium and the pure metallic material of Si or Cr between the parent material and the coating layer,
    wherein the pure metallic material of Si or Cr is coated on the parent material to a thickness ranging between 20 µm and 500 µm to form the coating layer, and the thermal treatment of step 4 is performed at 350° C. for 4 hours.

2. The method as set forth in claim 1, wherein the pre-treating at step 1 comprises grinding the surface of the parent material using particles of an oxide, a intermetallic compound or a silicon compound.

3. The method as set forth in claim 1, wherein the article is one of a cladding tube, a guide tube, an instrumentation tube and a spacer grid of a nuclear reactor.

4. The method as set forth in claim 1, wherein the zirconium alloy parent material has a resistance against oxidation by the pure metallic material of silicon (Si) or chromium (Cr) being oxidized to form silicon dioxide ($SiO_2$) or chromium oxide ($Cr_2O_3$).

5. The method as set forth in claim 1, wherein the pure metallic material of Si or Cr is deformable plastically, thereby restricting cracking or scraping off of the coating layer and improving bonding with the parent material.

6. A method for fabricating a coated zirconium alloy article, the method comprising steps of:
    pre-treating a surface of a zirconium alloy parent material (step 1);
    providing a pure metallic material of silicon (Si) or chromium (Cr) in powder form (step 2);
    plasma spraying only the pure metallic material of Si or Cr on the surface of the pre-treated parent material of step 1 (step 3) to form a coating layer on the pre-treated parent material; and
    thermally-treating the coated parent material coated in step 3 in an inert atmosphere (step 4) to create a diffusion layer comprising zirconium and the pure metallic material of Si or Cr between the parent material and the coating layer,
    wherein the pure metallic material is coated on the parent material to a thickness ranging between 20 and 500 µm to form the coating layer, and
    the thermal treatment of step 4 is performed at 350° C. for 4 hours.

* * * * *